United States Patent
Blase

(10) Patent No.: US 6,481,195 B1
(45) Date of Patent: Nov. 19, 2002

(54) ENERGY TRANSMISSION CHAIN SYSTEM

(75) Inventor: Günter Blase, Bergisch Gladbach (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 09/673,099
(22) PCT Filed: Apr. 20, 1999
(86) PCT No.: PCT/DE99/01198
§ 371 (c)(1),
(2), (4) Date: Nov. 27, 2000
(87) PCT Pub. No.: WO99/54641
PCT Pub. Date: Oct. 28, 1999

(30) Foreign Application Priority Data

Apr. 20, 1998 (DE) ...................... 298 06 969 U

(51) Int. Cl.[7] .................. F16G 13/00; H02G 11/100
(52) U.S. Cl. .................. 59/78.1; 248/49; 248/51
(58) Field of Search .............. 59/78.1; 248/49, 248/51

(56) References Cited

U.S. PATENT DOCUMENTS

| 3,433,889 A | | 3/1969 | DeVries, Jr. ................. 174/69 |
| 5,178,247 A | * | 1/1993 | Vagaggini ................... 59/78.1 |
| 5,649,415 A | * | 7/1997 | Pea ............................ 248/49 |
| 5,692,984 A | | 12/1997 | Kayatani et al. ............ 474/205 |
| 6,158,555 A | * | 12/2000 | Brown, Jr. .................... 59/78.1 |

FOREIGN PATENT DOCUMENTS

| DE | 3407169 | 2/1984 |
| DE | 3822385 | 7/1988 |
| DE | 9406570 | 4/1994 |
| DE | 29618663 | 10/1996 |

* cited by examiner

*Primary Examiner*—David Jones
(74) *Attorney, Agent, or Firm*—Drinker Biddle & Reath LLP

(57) ABSTRACT

The invention relates to an energy transmission chain for guiding tubes, cables or the like between two connecting points with variable vertical distance. The chain comprises links with two lateral parts that can be interconnected by means of at least one transverse pin. The adjacent links of the chain can pivot in relation to each other in an articulated manner on a plane forming a curved area. In order to provide an energy, transmission chain that can be inserted in-between the two vertically variable connecting points while preventing the energy transmission chain from sagging below the lower connecting point when its position is moved vertically upwards, the links of the chain are interspaced forming areas with opposite radii of curvature. Substantially rigid areas are provided in-between the U-bending areas of the energy transmission chain. The rigid areas can be configured in such a way that opposite lateral articulated areas of a pair of adjacent links can be U-bent in the opposite direction.

17 Claims, 4 Drawing Sheets

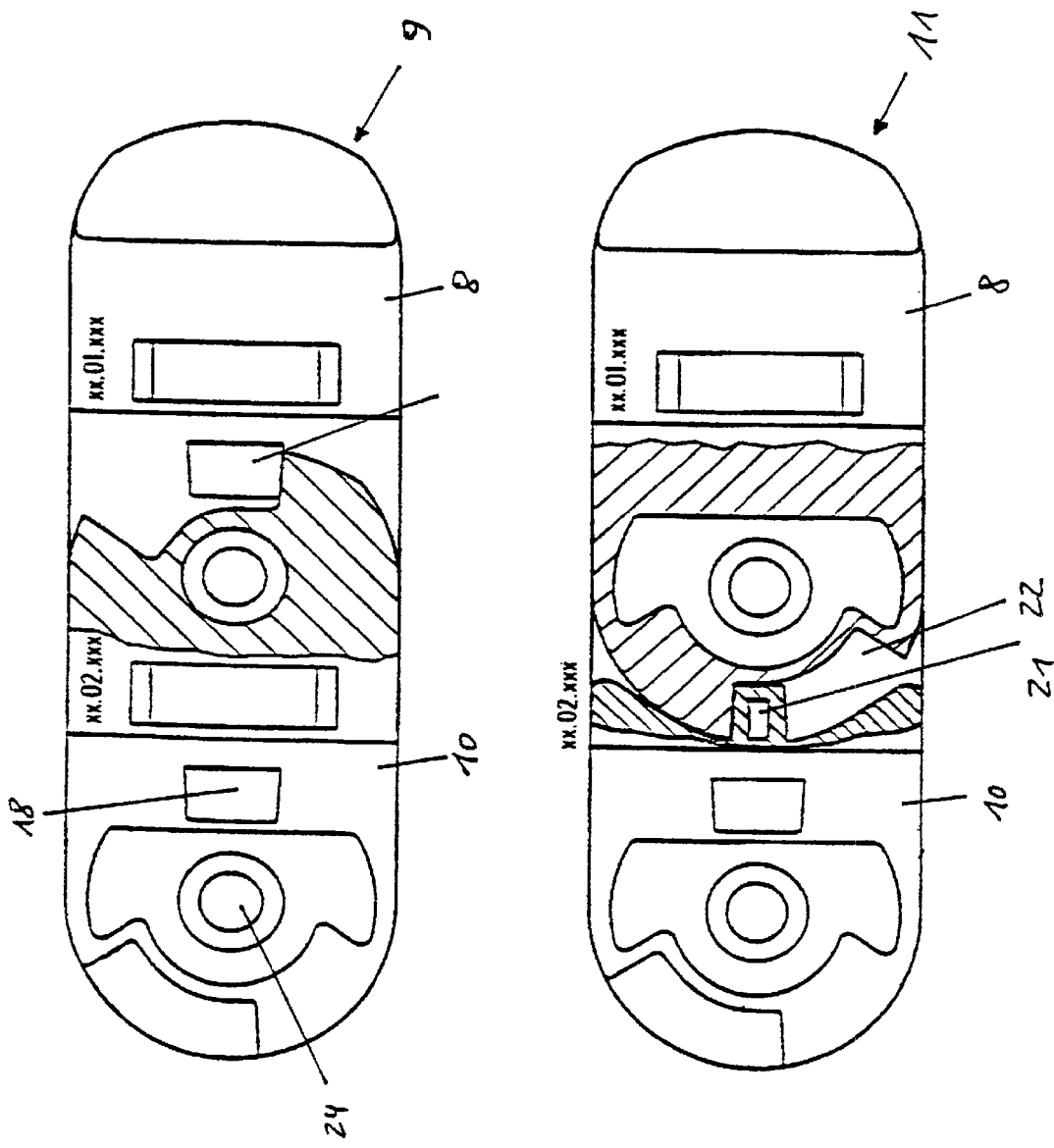

ENERGY TRANSMISSION CHAIN SYSTEM

FIELD OF THE INVENTION

The invention relates to a system comprising a consumer and a supplier, each having a connecting point, where the consumer and the supplier can be traversed, thereby varying the vertical distance between the connecting points, with an energy transmission chain located between the connecting points to guide lines, such as tubes, cables or the like, where adjacent chain links can pivot in relation to each other in an articulated manner on a plane, forming a curved area. The invention further relates to an energy transmission chain for a system of the kind mentioned above, where the chain links each have two lateral parts that are interconnected by means of at least one transverse pin.

BACKGROUND OF THE INVENTION

Systems of this kind with a consumer and a supplier than can be traversed vertically in relation to each other are used for a variety of purposes in mechanical engineering, and particularly in storage and retrieval systems, e.g. for storage and retrieval systems in high-bay warehouses.

The consumer then typically consists of a gripper device which is capable of retrieving pallets or other containers from a rack or depositing them in a rack. The consumer is usually capable of vertical movement in the rack aisle for this purpose. The corresponding supplier is usually located above the racking system at a defined and fixed height in the manner of a trolley and can be moved both within the aisles and transverse to the racks above the same, meaning that the gripper device used for loading and unloading the racks can be used in different rack aisles.

If the gripper device is to switch from one rack aisle to another, it has to be moved to a position above the racks in order to be able to cross them. To this end, the supply lines for the gripper device that are guided in the energy transmission chain have had to be coiled by means of a take-up device in the form of a cable drum that is mounted at the height of, or above, the supplier, so that the energy transmission chain does not collide with the racks when passing over them. However, the arrangement and operation of such a take-up device are relatively complex and cost-intensive. An energy transmission chain hanging loose in a U shape between the connecting points usually cannot be used for these applications.

The object of the invention is to create a system, comprising a consumer and a supplier with an energy transmission chain, that is of simple design and can be operated safely and with a minimum of maintenance effort, as well as an energy transmission chain whose design is particularly tailored to a system of this kind.

SUMMARY OF THE INVENTION

According to the invention, a receiving device for depositing the energy transmission chain is provided on the device lying lower down in the system in the vertical direction, that is to say, on the lower of the consumer and the supplier. An energy transmission chain for use in such a system is also provided.

Other advantageous configurations of the system or the energy transmission chain are recited in the dependent claims.

The receiving device can, for example, consist of a platform or a box open at the top, on or in which the energy transmission chain can be deposited when the vertical distance between the consumer and the supplier is less than the full length of the energy transmission chain. This eliminates the need for a take-up device with an additional drive motor and the like. Rather, the receiving device can be mounted directly on the respective consumer or supplier device and, for example, traversable with it. If the device lying lower in the vertical direction is located on the floor in stationary fashion and, for example, only the consumer can be traversed in the vertical direction, the receiving device can also be located on the floor in stationary fashion.

In this context, the receiving device can be designed to accommodate energy transmission chains folded in zigzag fashion, for instance in the form of an oblong box. In this case, the energy transmission chain can be deposited in several layers, one above the other, these being connected by deflection zones with a deflection arc of 180° or more.

The receiving device can also be designed in such a way that an energy transmission chain can be deposited in coil fashion, with several sections in the form of circular arcs lying one on top of the other, the coils being arranged in a horizontal plane.

An energy transmission chain for use in the system according to the invention can have chain links designed and interconnected in such a way that they allow the formation of interspaced deflection zones with curves in opposite directions, there being straight, essentially rigid sections provided between the deflection zones. The term "curves in opposite directions" means curves that turn in the clockwise sense and curves that turn in the anti-clockwise sense as seen in the same direction along the length of the energy transmission chain, such that, if these are arranged in alternating fashion, the energy transmission chain is deposited in meandering or zigzag fashion.

The arcs of deflection of the deflection zones of the deposited energy transmission chain can each be 180° or more. The straight sections located between the deflection zones can rest on each other over large areas or only at specific points. As a result, the energy transmission chain has a relatively small space requirement which, in particular, does not greatly exceed the width of the energy transmission chain.

In order to prevent the straight sections of the energy transmission chain from slipping off each other when folded, the lateral parts of the chain links can each be provided with guide pins which match corresponding guides on the adjacent chain links, or on other chain links located above or below the respective chain link, meaning that the arrangement of the deposited energy transmission chain is stabilised in itself. Particularly in the deflection zones, the guides can engage each other during the folding of the energy transmission chain, the result being that the rigid section of the energy transmission chain following on from a deflection zone is precisely aligned with the previously deposited section.

The essentially rigid sections of the energy transmission chain extend over a multiple of the length of a chain link of the deflection zone, advantageously covering the entire distance between adjacent deflection zones.

In the extended state of the energy transmission chain, that is to say, when it spans its maximum length, the deflection zones can be of elongated design, in which context the deflection zones can, if appropriate, also be designed in such a way that they can be bent into curves having opposite senses.

The chain links can also be designed in such a way that, if appropriate mechanical stops are provided, the angles of the deflection zones in the extended state of the energy transmission chain are significantly less than 180°.

Means can be provided which, particularly in the case of very long energy transmission chains, predetermine the pivoting direction of a section that follows on from a section that has already been deposited horizontally. As a result, the pivoting direction of the next section of the energy transmission chain to be deposited is always defined, even in the case of long energy transmission chains and rapid traversing of the consumer or the supplier in the vertical direction. Means of this kind can be created by way of an appropriate design of the mechanical stops on the chain links, by using spring elements or the like.

The rigid sections of the energy transmission chain can be formed by special chain links that are of a different design from the chain links of the bendable sections.

The rigid sections are advantageously assembled from individual chain links, where each link has two lateral parts that articulate to the lateral parts of the adjacent link, and each articulated area between lateral parts of adjacent links can be bent in only one direction. If the laterally opposite articulated areas of a pair of chain links can only be bent in opposite directions then the pair of chain links as a whole cannot be bent in either direction. This makes it possible to assemble the rigid sections from chain links of the same kind that can be used to construct the bendable sections. The special arrangement of the articulated areas causes the chain links to block each other, as the respectively opposite articulated areas can only be bent in opposite directions relative to each other.

This kind of arrangement of the articulated areas can be achieved particularly simply if the chain links have opposite lateral parts that are interconnected in detachable fashion by means of transverse pins. In this way, it is possible, for example, to construct a first strand of lateral parts that can only be bent in one direction relative to each other, e.g. in the clockwise direction, while the opposite strand of lateral parts can only be bent in the anti-clockwise direction. It is not necessary for a strand of lateral parts that can be bent in one direction to extend over the entire length of a rigid section of the energy transmission chain.

In this context, the lateral parts of the part strands that can be bent in opposite directions relative to each other can be of identical design, the change in the possible bending direction being achieved by the respective lateral part being oriented correspondingly on the energy transmission chain. Given an appropriate design and orientation of the lateral parts, it is possible to construct the deflection zones and the rigid sections of the energy transmission chain from lateral parts of a single design.

In order to restrict the pivoting of adjacent lateral parts, they can be provided with corresponding mechanical stops.

The lateral parts can be of cranked design, so that the rigid sections of the energy transmission chain can also easily be assembled using previously known lateral parts.

The lateral parts can also be of non-cranked design, in which case the middle area of the lateral parts is provided with a thicker area, on which transverse pins can be mounted by means of appropriate fastening devices or integrally moulded, the end areas of the lateral parts being provided with articulated connections of a kind familiar in energy transmission chains.

BRIEF DESCRIPTION OF THE DRAWINGS

The invention is described below by way of example and explained based on the figures. The figures show the following:

FIG. 3b is an end view of the lateral part of FIG. 3a;

FIG. 3c is an elevation view of a second side of the lateral part of FIG. 3a;

FIGS. 4a and 4b are side views, partly in section, of pairs of lateral parts according to FIG. 3, assembled into a rigid section, each forming sections of opposite strands of lateral parts.

DETAILED DESCRIPTION OF THE INVENTION

Figure 1:
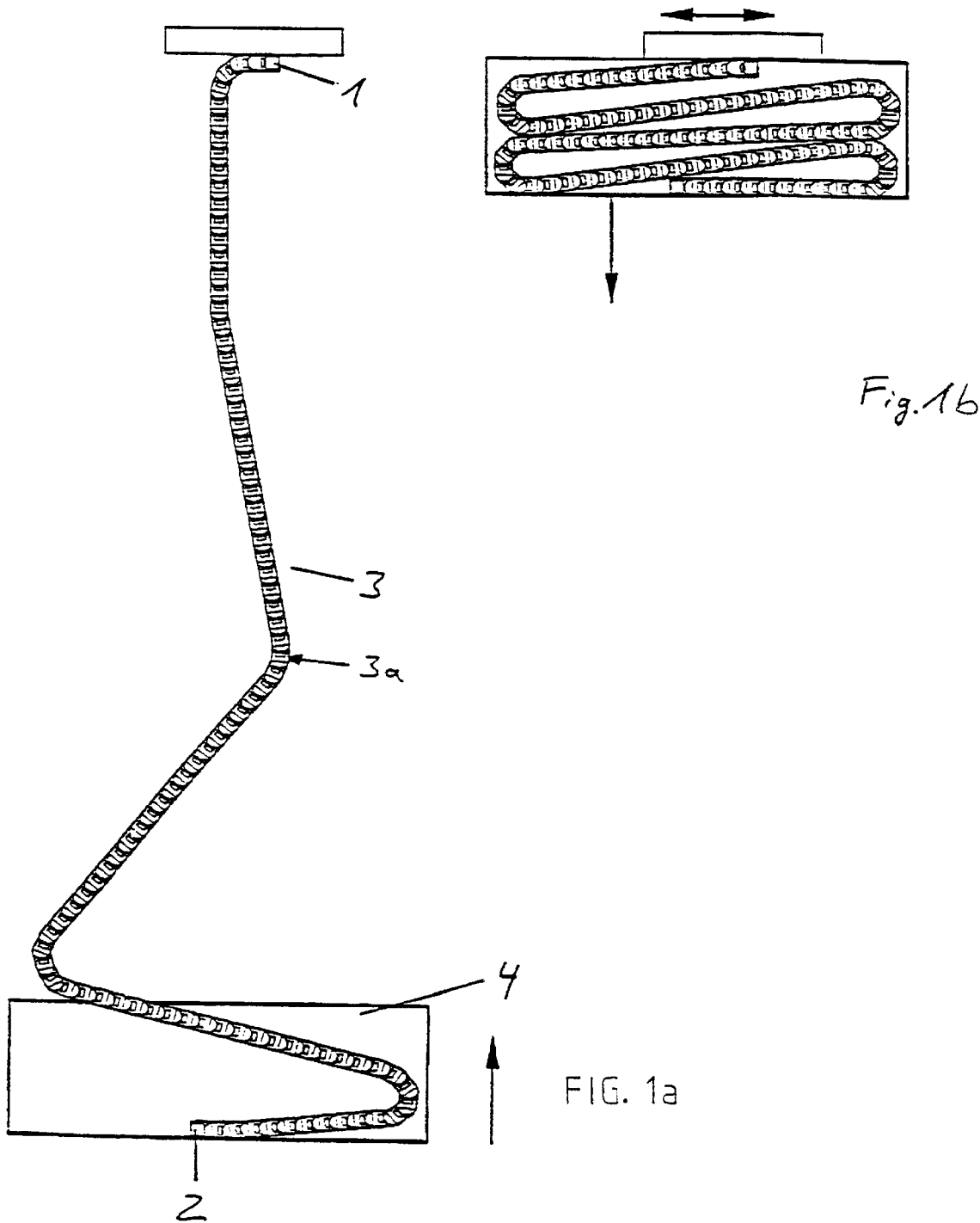
FIG. 1a is a view of a system comprising consumer, supplier and energy transmission chain in an extended state.
FIG. 1b is a view of the system of FIG. 1a in a contracted state.

FIG. 1 illustrates a system with a first connection 1, e.g. for a supplier, a second connection 2, e.g. for a consumer, and an energy transmission chain 3 running between these two, where connecting points 1, 2 of the supplier and consumer can be traversed horizontally or vertically relative to each other. The energy transmission chain 3 has chain links 3a, and is deposited in a box-shaped receiving device 4. The receiving device can, however, instead consist simply of a flat surface, if appropriate.

The manner in which the supplier and/or consumer are vertically arranged and traversed is immaterial for the present invention.

Figure 2:
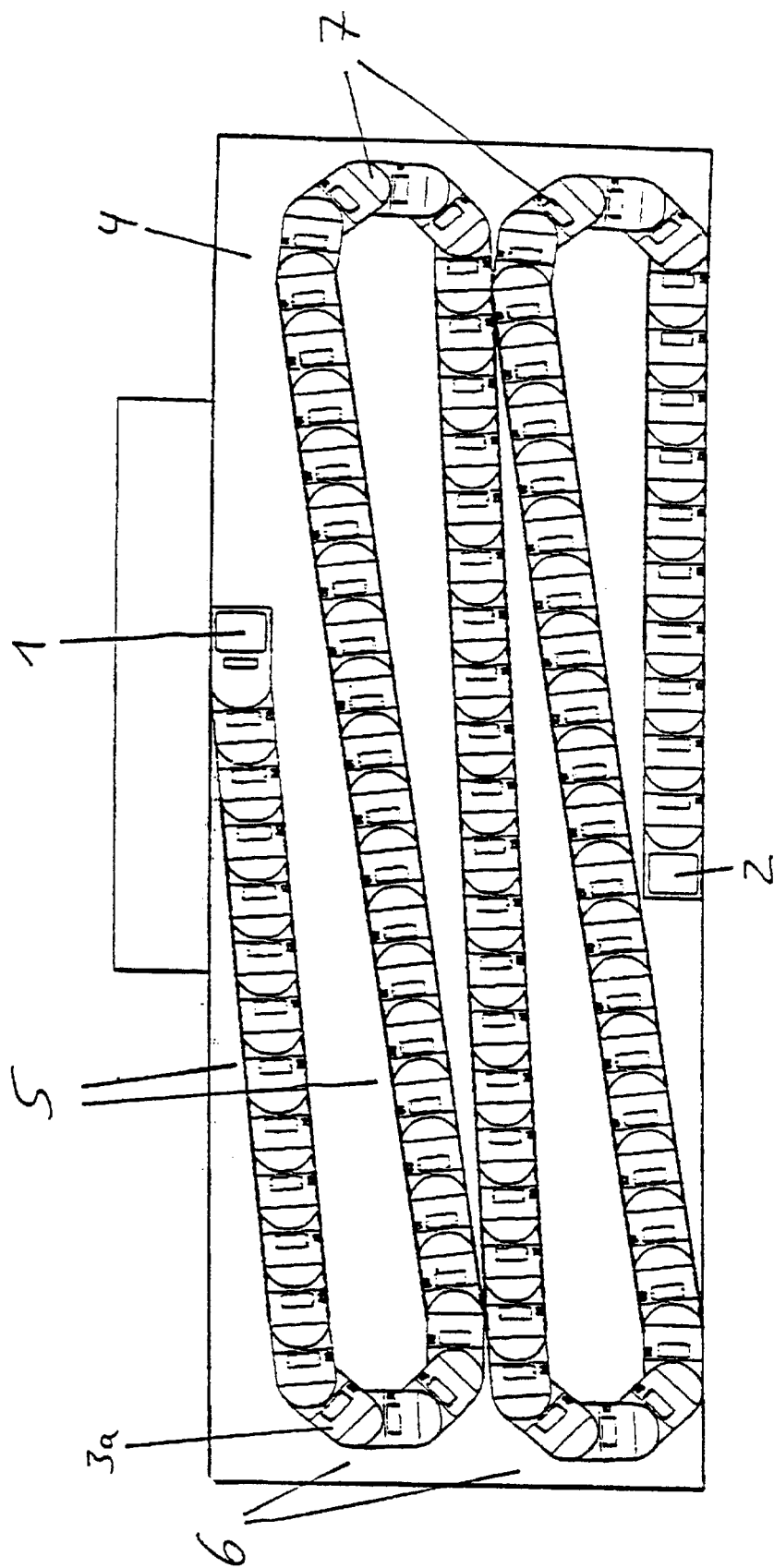
FIG. 2 is an enlarged view of a system according to FIG. 1b in the retracted state.
Figure 3C:
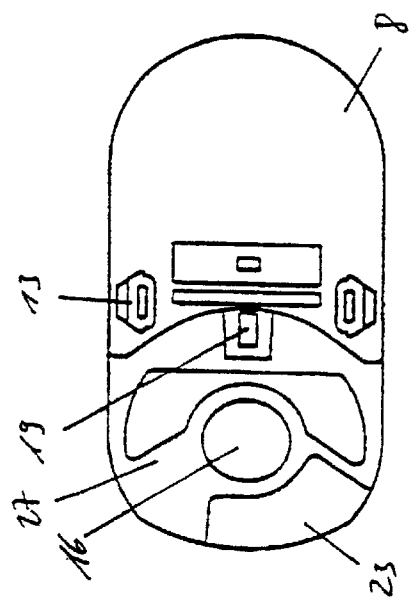
Figure 3F:
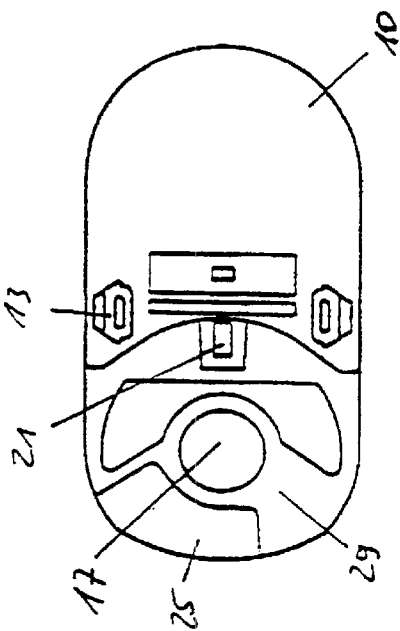
FIG. 3f is an elevation view of a second side of the lateral part of FIG. 3d.
Figure 3B:
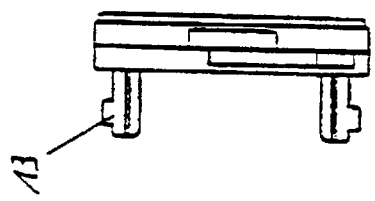
Figure 3E:
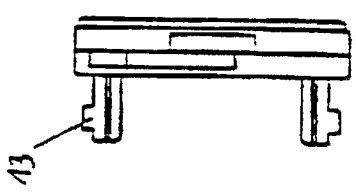
FIG. 3e is an end view of the lateral part of FIG. 3d.
Figure 3A:
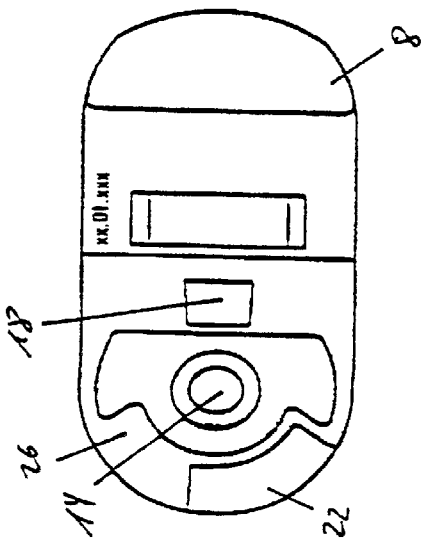
FIG. 3a is an elevation view of a first side of a first lateral part of a chain link.
Figure 3D:
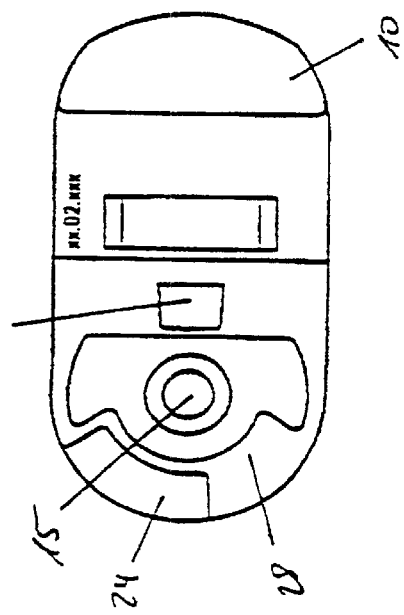
FIG. 3d is an elevation view of a first side of a second lateral part of a chain link.

The energy transmission chain in FIG. 2 is deposited in zigzag fashion, meaning that an essentially horizontal section 5 of the energy transmission chain is followed by a pivotable deflection zone 6, 7, and alternate deflection zones 6, 7 are curved in opposite directions.

In the unfolded or partially unfolded state, the deflection zones in the region of the upper end of the energy transmission chain are straight or almost straight (see FIG. 1).

In deflection zones 6, 7, the lateral parts are arranged relative to each other and designed in the same manner as in previously known energy transmission chains.

The rigid sections 5 are constructed from the lateral parts illustrated in FIGS. 3 and 4, where opposite lateral parts are detachably connected by means of locking pins 13 via transverse pins. Lateral parts 8, 10 each have pivot pins 14, 15, which are guided in corresponding recesses 17, 16 of the adjacent lateral parts, forming articulated areas when in assembled condition.

As can be seen from FIG. 4, a strand 9, 11 of lateral parts is assembled from alternating lateral parts 8, 10. In this context, each of the articulated areas is provided with mechanical stops 18, 19, 20, 21, which can be guided in circular arc-shaped recesses 22 to 29 by rotating the lateral parts until the ends of the recesses come into contact with the corresponding stops.

As can be seen from FIG. 4, rigid sections 5 are made up of alternating cranked lateral parts 8, 10. In this context, the pair of lateral parts shown in FIG. 4a (part of strand 9), for example, can only be bent upwards, while the pair shown FIG. 4b (part of strand 11) can only be bent downwards (i.e. the opening angle between the links faces up or down respectively). As regards the respectively opposite bending direction, the lateral parts are in the respective stop position. If the two lateral parts illustrated are now interconnected by transverse pins, the result is an essentially rigid segment of an energy transmission chain as a part of one of the sections 5.

Rigid area 5 of the energy transmission chain can also be constructed from lateral parts of identical design that are not of cranked design.

LIST OF REFERENCE NUMBERS 1 connecting point for supplier
2 connecting point for consumer
3 energy transmission chain
3a chain link
4 receiving device
5 rigid section
6 deflection zone
7 deflection zone
8 lateral part
9 strand
10 lateral part
11 strand
12 transverse pin
13 pin
14, 15 pivot pin
16, 17 pivot pin locator
18–21 mechanical stop
22–29 recess

What is claimed is:

1. A system comprising:
   a consumer and a supplier, each having a connecting point, at least one of the consumer and the supplier being vertically movable relative to the other so as to vary the vertical distance between the connecting points, one of the connecting points remaining below the other as the vertical distance between the consumer and supplier varies;
   an energy transmission chain for the guiding of lines between the consumer and supplier, the energy chain being engaged with the connecting points, the chain including links that are pivotally attached so that adjacent links can pivot in relation to each other in an articulated manner along a plane forming a curved portion; and
   a receiving device for receiving the energy transmission chain, the receiving device being provided proximate to the lower one of the consumer or supplier.

2. The system according to claim 1, wherein the receiving device is mounted directly on the lower one of the supplier or consumer.

3. The system according to claim 2, wherein the receiving device is mounted so as to move with the supplier or the consumer as it traverses.

4. The system according to claim 1, wherein the receiving device is mounted on a floor in stationary fashion.

5. The system according to claim 1, wherein the receiving device is a box open at the top and in which the energy transmission chain can be deposited.

6. The system according to claim 1, wherein the energy transmission chain can be folded in zigzag fashion so as to form several layers of chain lying one on top of the other.

7. The system according to claim 1, wherein the energy transmission chain can be coiled into the receiving device, with several sections forming circular arcs of chain lying one on top of the other, the coils being arranged in a substantially horizontal plane.

8. The system according to claim 1, wherein the receiving device is a box with an opening in the top, and wherein the lower connecting point is mounted inside the box such that the energy transmission chain extends out of the open top of the box.

9. An energy transmission chain for guiding lines between two connecting points with a variable vertical distance between them, the energy transmission chain comprising: chain links each having two lateral parts that are interconnected by means of at least one transverse pin and wherein adjacent chain links are pivotable in relation to each other in an articulated manner on a plane so as to form a curved area, the energy transmission chain being foldable in zigzag fashion so as to form several layers of chain lying one on top of the other with adjacent layers being interconnected by the curved areas of the chain.

10. The energy transmission chain according to claim 9, wherein the chain links that form the curved areas define a bendable sections of the chain and are separated by substantially rigid sections.

11. The energy transmission chain according to claim 10, wherein the rigid sections include chain links with articulated areas, wherein respectively laterally opposite articulated areas of each pair of adjacent chain links permits bending only in opposite directions relative to each other.

12. The energy transmission chain according to claim 10, wherein the bendable and the rigid sections of the energy transmission chain are formed from chain links with lateral parts of identical design.

13. The energy transmission chain according to claim 12, wherein the lateral parts each have mechanical stops which limit the pivoting of adjacent lateral parts.

14. The energy transmission chain according to claim 12, wherein the lateral parts include mechanical stops that come into contact with each other when the lateral parts are in a straight arrangement and in a bent position.

15. The energy transmission chain according to claim 12, wherein the lateral parts are of cranked design.

16. The energy transmission chain according to claim 12, wherein the lateral parts of the chain links include guide pins that match corresponding guides on the adjacent chain links.

17. A system comprising:
   a consumer and a supplier, each having a connecting point, at least one of the consumer and the supplier being vertically movable relative to the other so as to vary the vertical distance between the connecting points, one of the connecting point remaining below the other as the vertical distance between the consumer and supplier varies;
   an energy transmission chain for the guiding of lines between the consumer and supplier, the energy chain being engaged with the connecting points, the chain including substantially rigid sections and flexible portions, the flexible portions comprising links that are pivotally attached so that adjacent links can pivot in relation to each other in an articulated manner along a plane forming a curved portion; and
   a receiving device for receiving the energy transmission chain, the receiving device being provided proximate to the lower one of the consumer or supplier.

* * * * *